April 12, 1932.  S. CHALIKIAN  1,853,037
PASTRY AND METHOD OF MAKING THE SAME
Filed Feb. 3, 1931
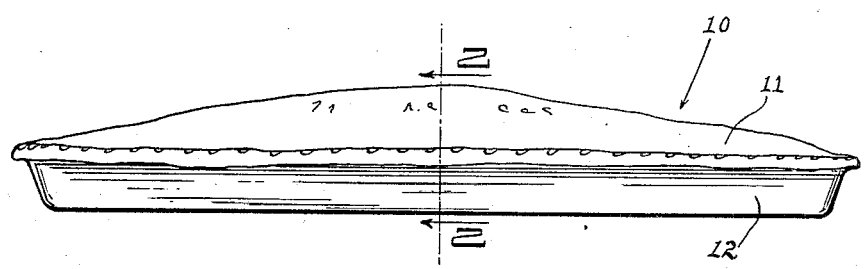
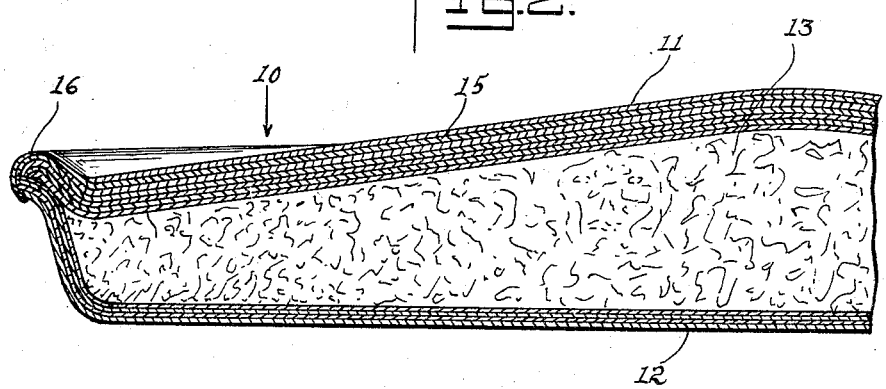
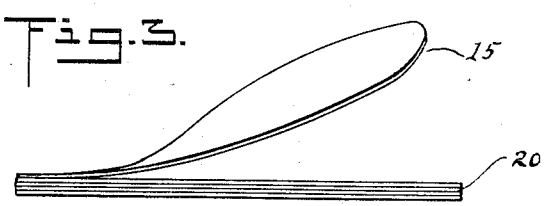
Inventor
SAMUEL CHALIKIAN
By Clarence A O'Brien
Attorney Patented Apr. 12, 1932

1,853,037

UNITED STATES PATENT OFFICE

SAMUEL CHALIKIAN, OF NEW YORK, N. Y.

PASTRY AND METHOD OF MAKING THE SAME

Application filed February 3, 1931. Serial No. 513,187.

This invention relates to new and useful improvements in the art of baking pastries.

It is one object of the invention to provide a pastry, or pastry crust which will be possessed of extreme lightness and crispness.

It is another object of the invention to provide a pastry or pastry crust, which although formed from materials of a more or less starchy nature, will in itself contain practically no starch when completed.

With the above and other objects in view, reference will be had to the accompanying drawings, and the following detailed description thereof.

In the drawings:

Figure 1 is a view in elevation of a piece of pastry herein illustrated as a pie, which is constructed in accordance with the present invention, Figure 2 is a fragmentary sectional view thereof taken on the line 2—2 of Figure 1, and;

Figure 3 is a detail view illustrating the construction of the top or cover crust of the pie.

In the drawings, the pie is designated 10, and it comprises a top or cover crust 11 and a bottom or enclosing crust 12. As best illustrated in Figure 2, these crusts enclose a suitable filling such as 13 which may be of any desired form or type.

Each of the crusts 11 and 12, consists of a plurality of very thin members such as 15 super-imposed upon each other. The body of the crusts thus formed may comprise any desired number of members 15, and I have found in actual practice that as many as twenty or more of such members may be combined to form a crust.

The cover crust 11 consists of the members which are super-imposed upon each other, and as best illustrated at 16 in Figure 2, certain of the upper or topmost members 15 are larger than those upon which they are superimposed in order that these upper members may overlie the defining edges of the under members as illustrated in order to form a tight sealing joint between the cover crust and the lower crust when a pie is formed.

In Figure 3 I have illustrated the manner in which the crusts may be formed, and as illustrated the main body of the crust is designated 20 and comprises a plurality of relatively thin or very thin individual members 15 which are super-imposed upon one another as heretofore described.

The crusts may be formed from any suitable materials commonly employed in the manufacture of pastries, and as is well known, such materials include a highly starchy content. In order to remove this starchy content and render the finished crusts substantially starch free, I proceed to manufacture the pastry in accordance with the following method.

The dough is formed in the usual manner after which it is passed through boiling water or other relatively hot liquid to liberate the starch therefrom. The dough after this step in the treatment is wrapped in a suitable cloth to maintain its moisture and is left in this wrapped condition for approximately an hour after which it is taken out and rolled into relatively thin layers. After the rolling operation which may be carried out by an ordinary hand roller, the dough is passed through a machine by means of which it is flattened into very thin sheets after which it may be cut to the desired shape and size and the sheets super-imposed upon each other as heretofore described to form the crusts.

A pie crust constructed in accordance with the present invention will not only be light fluffy and crisp, but will be practically starch free and when employed in the ordinary manner of making pies will produce a pie or similar pastry which will be highly palatable.

While the invention has been herein described in a preferred form, it is to be understood that the invention is not to be limited to the specific construction herein illustrated, but may be practiced in other forms without departing from the spirit thereof.

Having thus described the invention, what is claimed as new, and what it is desired to secure by Letters Patent of the United States, is:

1. A pie or similar filled pastry comprising a filling retaining body portion, and a cover crust, said cover crust comprising a plurality of extremely thin elements super-imposed one upon the other, the uppermost few of said thin elements having their defining edges extended beyond the defining edges of the subterposed members.

2. A cover crust for pies and similar filled pastries comprising a body portion formed of a plurality of separate relatively thin dough elements super-imposed on one another, certain of said elements being of larger dimension than the remaining elements.

3. A filled pastry comprising a bottom crust, and a cover crust, each of said crusts comprising a plurality of super-imposed relatively thin dough members, certain of which of the cover crust are larger than the remaining members of said crust.

4. The method of making pastries which consists in forming a dough from suitable materials including starch, subjecting said dough to the action of a heated liquid to liberate the starch, suitably wrapping the dough for a predetermined period to retain its moisture content, subsequently working said dough into extremely thin sheets, super-imposing a plurality of said thin sheets of dough upon one another to form a pastry article of the desired type, and subsequently baking said article of pastry.

In testimony whereof I affix my signature.

SAMUEL CHALIKIAN.